July 18, 1950 — H. BLUM — 2,515,921
FILM VIEWING DEVICE
Filed Jan. 24, 1948 — 3 Sheets-Sheet 1
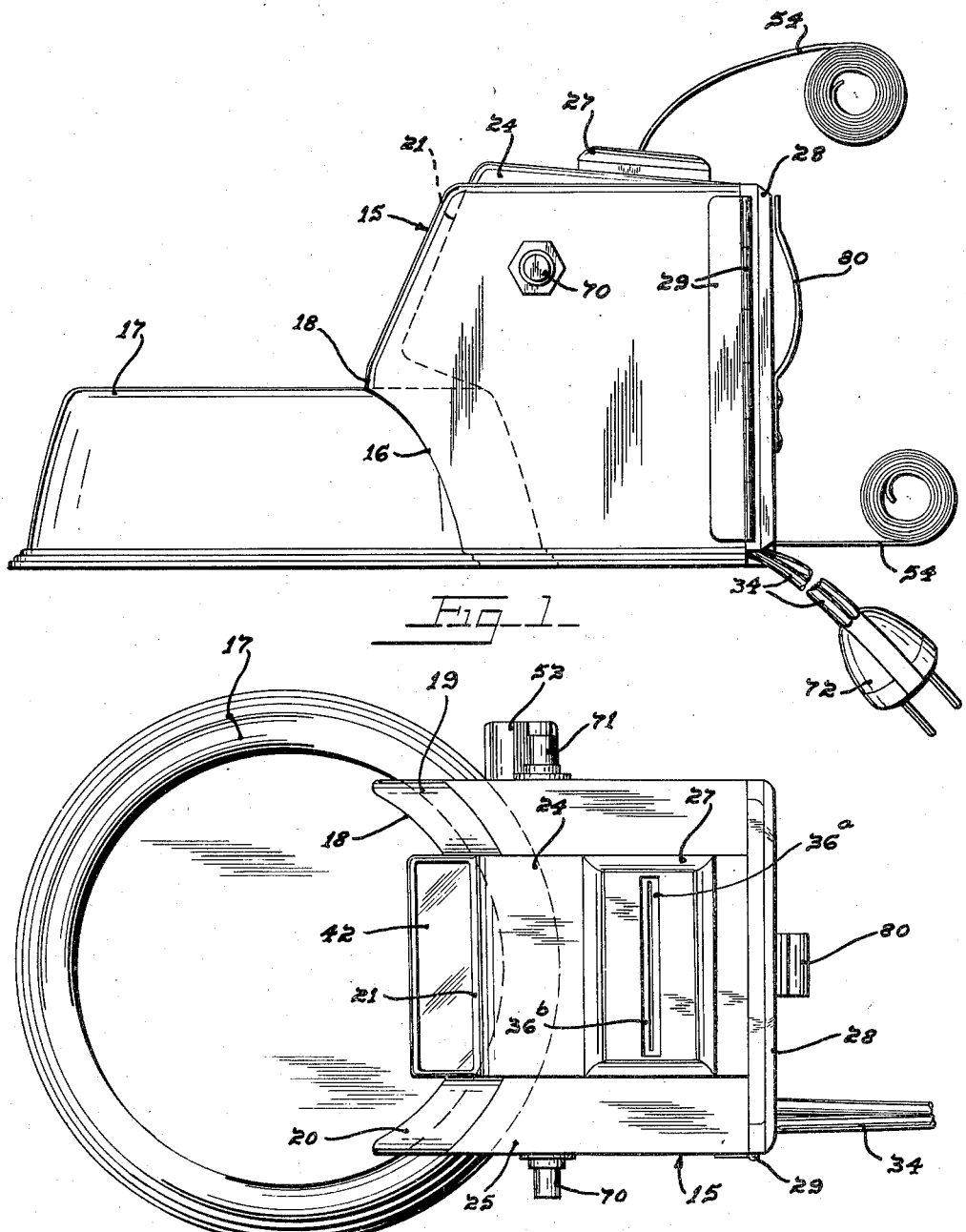
INVENTOR.
HARRY BLUM
BY
ATTORNEY

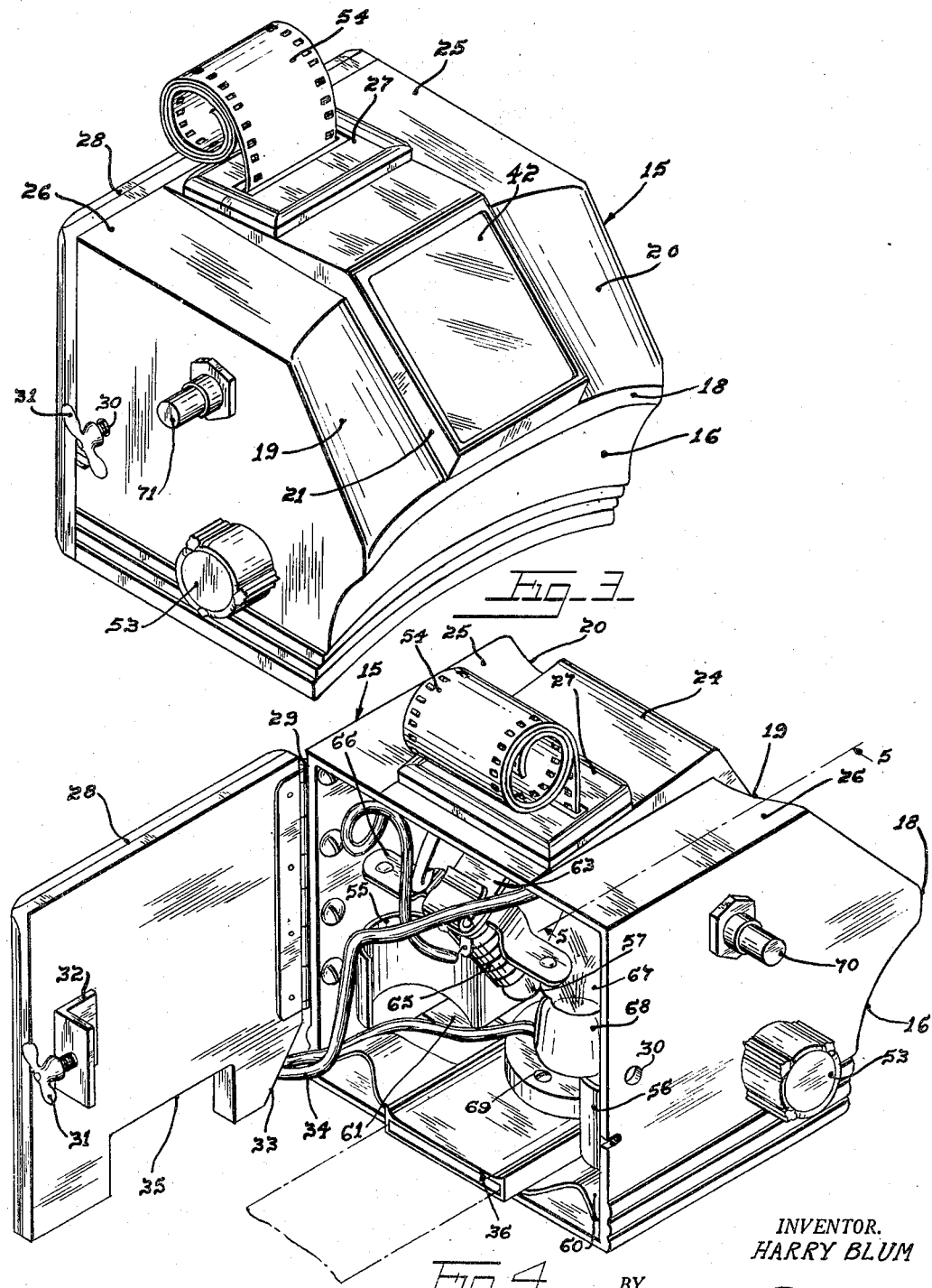

July 18, 1950 H. BLUM 2,515,921
FILM VIEWING DEVICE
Filed Jan. 24, 1948 3 Sheets-Sheet 3

INVENTOR.
HARRY BLUM
BY
ATTORNEY

Patented July 18, 1950

2,515,921

UNITED STATES PATENT OFFICE 2,515,921

FILM VIEWING DEVICE

Harry Blum, New York, N. Y.

Application January 24, 1948, Serial No. 4,107

2 Claims. (Cl. 40—28)

This invention relates to new and useful improvements in film viewing devices.

A particular object of the invention is to provide a compact casing carrying interiorly a passageway or chute through which a film may be manually endwisely advanced and moved forward and backward as desired relative to a shadow-box having a specially located peep opening, desirably served by a magnifying glass, and also carrying interiorly an illuminating means for lighting up the photograph on the film which is framed at the objective end of the shadow-box, in combination with simple yet dependably operating means for manually moving the film along the chute to position a selected photograph on the film for such framing.

A feature of the invention is that two different illuminating lamps are provided within the box, together with a source of current, as one or more batteries, for one of such lamps, and also together with such wiring arrangements and switches that at will one of said switches may be used to place one of the lamps in circuit or the other may be used for connecting the other lamp with an exterior source of current.

A further feature of the invention is that the chute is so disposed that, with the film passed through the casing in one of two possible directions, it may be quickly, easily and safely endwisely entered into a lower end of the chute at the rear of the casing near the floor thereof; the chute being so extended from said end, that it progresses forward along said floor and then has a curvilinear path and then continues upwardly rearwardly at an oblique angle, to have its opposite end terminate at the top of the casing, so that the shadow-box may be rearwardly downwardly inclined at the front of the casing for comfortable and best view of the selectively framed photograph on the film.

Still another feature of the invention is an arrangement of the parts such that the film chute, where it traverses said curvilinear part of its path of extension, is provided with side wing extensions for rotatively mounting a feed roller which, manually turnable from the exterior of the casing, constitutes with a wall of the chute the means for moving the film along the chute.

Also, the lower front of the casing is concavely laterally curved, to match the convex periphery of an auxiliary receptacle of bowl-like character, below called the bowl, whereby the latter may be snugly fitted up to and forwardly projected from the lower front portion of the casing, yet without interfering with easy operation of a knob or the like provided for turning the feed roller.

Various other features have to do with coactions between the parts, both mechanical and electrical, in aid of simplicity of construction, minimization of auxiliary wiring, reduced cost of manufacture, and efficient and reliable operation.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevation of the device, fitted up against the separable bowl.

Fig. 2 is a top plan view, showing the casing and bowl fitted together as in Fig. 1.

Fig. 3 is a perspective view of the casing, with the bowl removed.

Fig. 4 is a perspective view of said casing looking toward the back thereof, with its rear door open.

The film viewing device, according to the present invention, includes a casing 15 formed at the front thereof with a bottom concavity 16, into which may be interfitted, as shown in Figs. 1 and 2, a bowl 17 for use as a tray for placing a child's food plate therein, to encourage the eating of the food in the plate.

Figure 5:
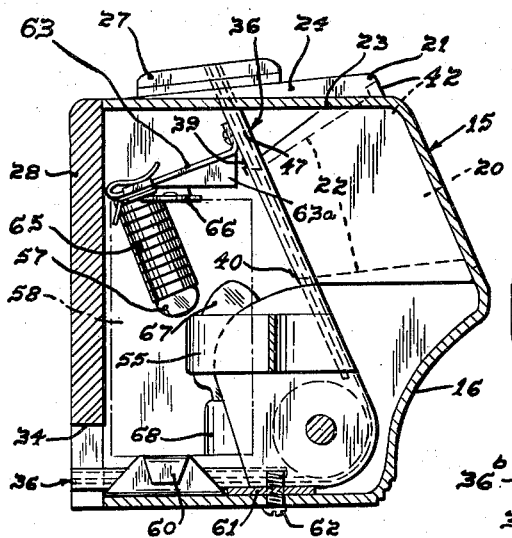
Fig. 5 is a vertical section, taken on the line 5—5 of Fig. 4.

Above the concavity 16 and the transversely curvilinear eave portion 18 thereabove, the casing front extends upwardly and rearwardly and with a lateral curvature matching that of said eave portion at two side panel areas 19 and 20, between which panel areas is a rearwardly upwardly inclined large square projection 21 marking the front of the shadow-box 22 in the shape of the frustum of a four-sided pyramid (Fig. 5). As best shown in the view last mentioned, the shadow-box 22 is formed integral with the main body 23 of the casing 15.

Above the shadow-box 22, the casing 15 has a central protuberance 24, rectangular in plan, the upper surface of which inclines downwardly rearwardly to merge at the rear of the casing with two horizontal and symmetrically laterally concavely rounded side panel areas 25 and 26. Toward the rear of the casing, said protuberance 24 is upwardly extended by a block formation 27.

The casing 15 is open all over at its rear end, and is there provided with a door 28, hinged as at 29. Any suitable latching means may be used to hold the door closed, but, as shown in Fig. 4, the latching means incorporates a hole 30 in a side wall of the main body 23 of the casing 15, and a wing-head screw 31 threadedly engaged with an L-bracket 32 secured to the inside of the door 28. When the door is closed, the shank of the screw 31 is passed through the hole 30 and threaded into the bracket 32, so that tightening of the screw may clamp its head against said casing wall to lock the door closed.

To allow exit from the casing of a portion of the wiring to be connected to the external source of current a bottom corner of the door is cut away as indicated at 33. Said portion of the wiring is marked 34 in Figs. 1, 2 and 4, but, in order to keep the drawings as clear as possible, neither it nor any other of the wiring elements are shown in any of the views, except in Fig. 8, to which detailed reference will later be made.

The door 28 has a further cut-out 35, through which slightly projects, when the door is closed, the lower end of the film chute 36. As best shown in Fig. 5, the chute 36 extends along the floor of the casing 15 and then curvilinearly ascends (at 36', Figs. 6 and 7), after which it rearwardly upwardly inclines until its upper end reaches the top of the block 27 provided with a matching slot.

Where the last mentioned length of the chute 36 passes the inner end of the shadow-box 22, the former is cut away at top and bottom walls to provide openings 37 and 38 aligned with each other and aligned with the inner open end of the shadow-box. Along the top and bottom edges of the opening 37 are secured Z-strips 39 and 40, between which may be snapped one, two or more thin, lightly frosted light-diffusion sheets 41, made, for instance, of acetate sheet material.

The larger end of the shadow-box 22 is perimetrically enlarged at the front of the casing, to provide a shouldered recess, as indicated in broken lines in Fig. 5, for seating a magnifying glass 42.

Figure 6:
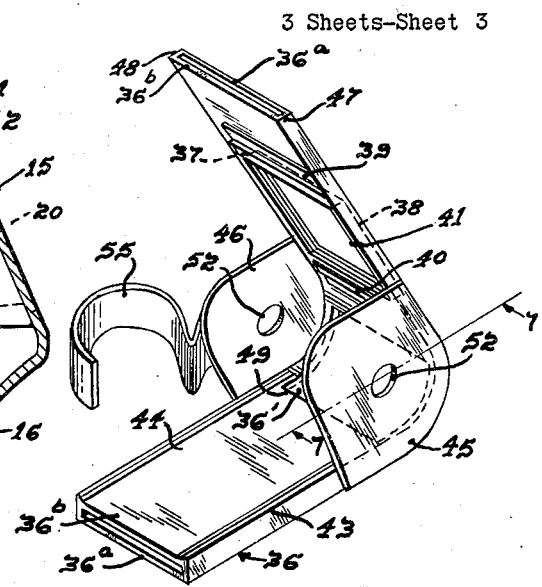
Fig. 6 is an enlarged perspective detail view, showing the film chute, and one of several parts carried thereby, but with the feed roller removed.

The wall of the chute 36 which is its bottom wall, where the chute runs along the floor of the casing 15, this wall marked 36$^a$ in Fig. 6, is continuous from end to end of the chute, and its opposite wall 36$^b$ is likewise thus continuous. These walls 36$^a$ and 36$^b$ are joined at opposite sides by like sheet pieces 43 and 44 having upstanding wings 45 and 46. Above the tops of the wings, the walls 36$^a$ and 36$^b$ are joined at opposite sides by strips 47 and 48; the bottoms of the strips meeting the front portions of the horizontal top edges of the wings 45 and 46, so that the inner surfaces of the strips 47 and 48 are perfectly flush with the inner sides of the wings 45 and 46 where along their curved bottoms they participate in establishing the chute 36 at its curvilinear ascension 36'.

Within the curvilinear ascension 36' the wall 36$^b$ has an opening 49, through which projects the feed roller 50, desirably of fairly soft rubber, and fixed on a shaft 51 journalled in aligned apertures 52 in the wings 45 and 46 and extended through an aligned aperture in that side wall of the casing 15 which is seen in Fig. 3. The thus projected part of the shaft 51 has fixed thereon a hand-knob 53.

Figure 7:
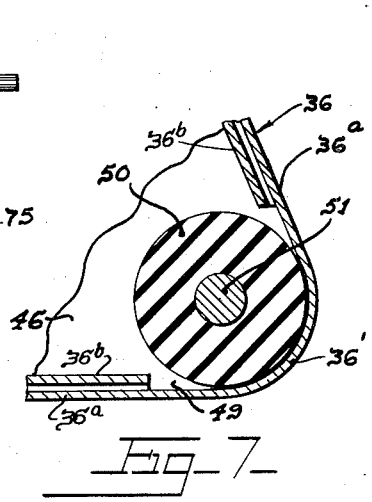
Fig. 7 is a fragmentary detail view, being a vertical section taken on the line 7—7 of Fig. 6.

It will be noted from Fig. 7 that the shaft 51 is so placed at the forward lower zone of the field of operation of the roller 50 that the roller is pressed against the chute wall 36$^a$. Thus, the instant the forward end of a film 54 (such film shown only in Figs. 1, 3 and 4) is advanced to come well under roller 50, turning of the latter in a counter-clockwise direction as viewed in Fig. 7 results in immediate firm seizure of the film for further precise feed of the film in response to turning of the knob 53.

Because of the inclusion of the wings 45 and 46, not only is an ideal mounting for the roller 50 afforded, but the chute is held to rigidity of predetermined direction of extension from end to end, its immovable fixation in the casing 15 is simplified, and efficient holding means are given for the bent-strip clip-holders 55 and 56 for a pair of batteries 58 for supplying current to energize an electric light bulb 57.

Figure 8:
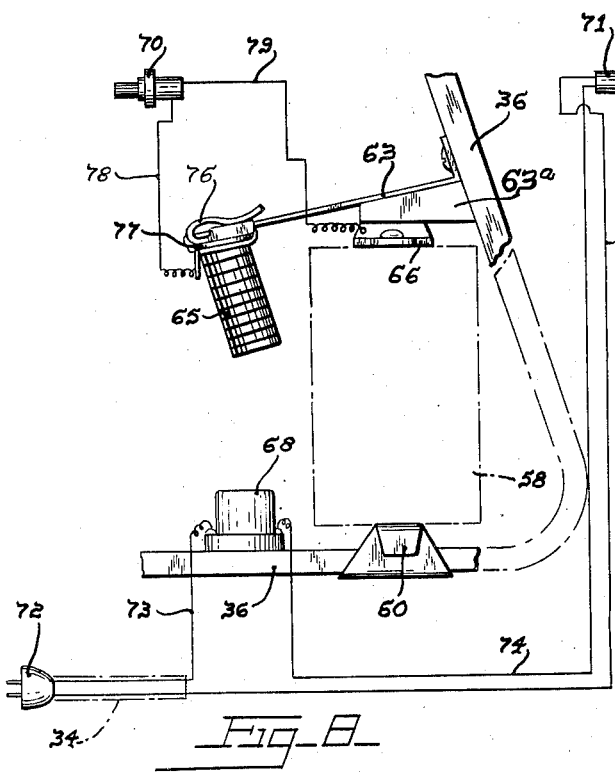
Fig. 8 is mainly a schematic view, showing the wiring and other circuit-making arrangements within the casing.

The two batteries 58 are omitted from Fig. 4, to avoid confusing the illustration, but their positions are indicated clearly in Figs. 5 and 8, where the near battery 58 is outlined in dot and dash lines. In line with this battery, across the width of the casing 15, there is located the companion battery 58. Each battery is snappingly received in one of the holders 55 and 56, with the bottom of each battery resting on one of the opposite, upwardly bowed end portions of a substantially M-shaped strip 60, secured to the underside of the chute 36.

For holding the chute 36 in position in the casing 15, a flat metal strip 61 (Figs. 4 and 5) is also secured, near its middle, to the underside of the chute; and the end portions of the strip 61 have tapped holes for receiving screws 62, which when tightened up anchor the strip 61 to the floor of the casing 15.

Thereby, and with the chute stiffened as aforesaid by the wings 45 and 46, and following insertion of the upper end of the chute into its slot through the block 27 at the top of the casing, it is merely necessary to swing the chute into position as illustrated in Fig. 5 and apply the screws 62. Before thus mounting the chute, indeed before the wing-carrying pieces 43 and 44 are secured as parts of the chute, the roller 50 will be placed in position, together with its shaft 51; and before the upper end of the chute is entered in said slot, the chute is manipulated to send, through the appointed aperture in a side wall of the casing, the end portion of said shaft later to be equipped with the knob 53.

As will be understood, before the insertion of the chute 36 into the casing 15 for securement thereto by the strip 61 and the screws 62, the battery holding clips 55 and 56, and the strip 60, are all connected to the chute 36.

Also before insertion of the chute 36 into the casing, there is mounted on the same (Figs. 4 and 5) an L-shaped metal bracket 63 and at the free end of the bracket 63 there is secured a familiar type of socket 65 for the bulb 57, and also there are secured to the underside of the bracket spring metal strips 66 for engaging at their opposite end portions the top electrodes of the two batteries 58. Thus, the strips 66 are included in the circuit for the bulb 57 as will be explained in Fig. 8 with particularity. The strips 66 are insulated from each other by being mounted in spaced relation on an insulation block 63a with the metallic mounting means of the far strip 66, as viewed in Fig. 8, passing completely through that block 63a to contact the bracket 63.

A light bulb 67 to be served by an exterior source of current is shown mounted in a familiar porcelain type socket 68 which is secured to the chute 36, by screws 69, see Fig. 4. The chute 36, like the strip 60 and the strip 66, is of metal. And here it may be explained that with the strips 60 and 66 also of metal, the finger-beam 63 is of conductive material, and the main body 23 of the casing 15 is of insulation material; which latter has been satisfactorily made as a single, molded piece of a plastic of insulating nature.

At one side of the casing 15 there is a switch 70, and at its opposite side there is a switch 71; the former for the interior circuit for the light bulb 57, and the latter for the lamp bulb 67. Desirably, both these switches are of the push-button type, and are so constructed that one inward push of its button closes its circuit, which stays closed until the said button is pushed in again, when the circuit is opened.

Referring now to Fig. 8, where the wiring 34 of Figs. 1, 2 and 4 is diagrammatically indicated, together with its plug 72 for insertion in a current-supply outlet from an ordinary house circuit, from the plug 72 a wire 73 goes to the socket 68, a wire 74 goes from said socket to the switch 71, and from the latter a wire 75 goes back to the plug 72.

The circuit in which are interposed the switch 70, the socket 65, and the batteries 58, has said batteries in series relation therein. Thus, starting with the battery 58 indicated in dot and dash lines in Fig. 8, the circuit may be traced as including the strip 60, the chute 36, the opposite battery 58, its strip 66, the bracket 63, one terminal 76 of the socket 65, the other terminal 77 thereof, a wire 78 to the switch 70, and a wire 79 to the other strip 66 and so back to the first battery 58.

Thus interior wires are minimized to such an extent that merely five wires (73, 74, 75, 78 and 79) have to be accommodated in the casing 15. The device is thereby further made compact, lightened in weight, and reduced in bulk, and therefore easily portable. At the back of the door 28 is secured a spring clip 80, for securely holding the circuit portion 34 in back and forth looped arrangement, when the device is being carried from one place to another, or while otherwise it is not in use.

It is to be understood that this film viewing device may accommodate any standard film such as a 35 mm. film and suitable attachments may be provided to guide a smaller film such as a 16 or 8 mm. film through the device.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent, is:

1. In a film viewing device having a casing including an inclined front wall, a bottom wall, a top wall, spaced side walls and an openable back door, said front wall being formed adjacent its top with an opening, a magnifying glass closing said opening, a hollow shadow box within said casing having its front end surrounding said opening and its rear end open, a chute for a film strip having spaced walls for extending along the opposite faces of the film strip and comprising a bottom portion, a portion inclined upwardly and rearwardly parallel to the front wall and a curved portion connecting said portions, said upwardly inclined portion having an apertured area passing the open rear end of said shadow box, a bracket extended rearward from the upwardly inclined portion of said chute for supporting a lamp bulb for illuminating the portion of the film passing said apertured area to be viewed in said magnifying glass, and means in the curved portion of said chute for continuously feeding a film strip from the bottom portion to the upwardly inclined portion of said chute past said apertured area, said means comprising spaced wings extending rearward from the curved portion of said chute, said wings being formed with horizontally aligned openings arranged concentric with the curve of said curved portion, a shaft rotatively extended through said openings, the wall of said chute on the inside of said curved portion being formed with an opening exposing one side of the film strip passing through said chute, and a friction roller fixedly mounted on said shaft between said wings and of a diameter to cause the film strip to be gripped between the periphery of said roller and the inside face of the wall of said chute on the outside of the curved portion for feeding the film strip through said chute as said shaft is rotated to in turn rotate said roller.

2. In a film viewing device having a casing including an inclined front wall, a bottom wall, a top wall, spaced side walls and an openable back door, said front wall being formed adjacent its top with an opening, a magnifying glass closing said opening, a hollow shadow box within said casing having its front end surrounding said opening and its rear end open, a chute for a film strip having spaced walls for extending along the opposite faces of the film strip and comprising a bottom portion, a portion inclined upwardly and rearwardly parallel to the front wall and a curved portion connecting said portions, said upwardly inclined portion having an apertured area passing the open rear end of said shadow box, a bracket extended rearward from the upwardly inclined portion of said chute for supporting a lamp bulb for illuminating the portion of the film passing said apertured area to be viewed in said magnifying glass, and means in the curved portion of said chute for continuously feeding a film strip from the bottom portion to the upwardly inclined portion of said chute past said apertured area, said means comprising space wings extending rearward from the curved portion of said chute, said wings being formed with horizontally aligned openings arranged concentric with the curve of said curved portion, a shaft rotatively extended through said openings, the wall of said chute on the inside of said curved portion being formed with an opening exposing one side of the film strip passing through said chute, and a friction roller fixedly mounted on said shaft between said wings and of a diameter to cause the film strip to be gripped between the periphery of said roller and the inside face of the wall of said chute on the outside of the curved portion for feeding the film strip through said chute as said shaft is rotated to in turn rotate said roller, and clip-holders mounted on said wings and extended rearward therefrom for supporting batteries to supply the required electrical current to illuminate the lamp bulb supported by said bracket.

HARRY BLUM.

REFERENCES CITED

The following references are of record in the file of this patent:

UNITED STATES PATENTS

| Number | Name | Date |
|---|---|---|
| 1,553,906 | Marette | Sept. 15, 1925 |
| 1,573,825 | Grunfeld | Feb. 23, 1926 |
| 1,890,172 | Wright | Dec. 6, 1932 |
| 1,973,318 | Lee | Sept. 11, 1934 |
| 2,010,551 | McConalogue | Aug. 6, 1935 |
| 2,178,812 | Schade | Nov. 7, 1939 |
| 2,239,032 | Boch | Apr. 22, 1941 |
| 2,342,874 | Links et al. | Feb. 29, 1944 |
| 2,394,711 | Miesegaes | Feb. 12, 1946 |
| 2,407,009 | Holbrook | Sept. 3, 1946 |

FOREIGN PATENTS

| Number | Country | Date |
|---|---|---|
| 103,327 | Austria | May 10, 1926 |
| 514,613 | Great Britain | Feb. 7, 1938 |
| 854,581 | France | Jan. 24, 1940 |